Oct. 14, 1958     J. GARNIER     2,856,014
VEHICLE HAVING COMPOSITE PROPULSION MEANS
Filed July 27, 1955     4 Sheets-Sheet 1
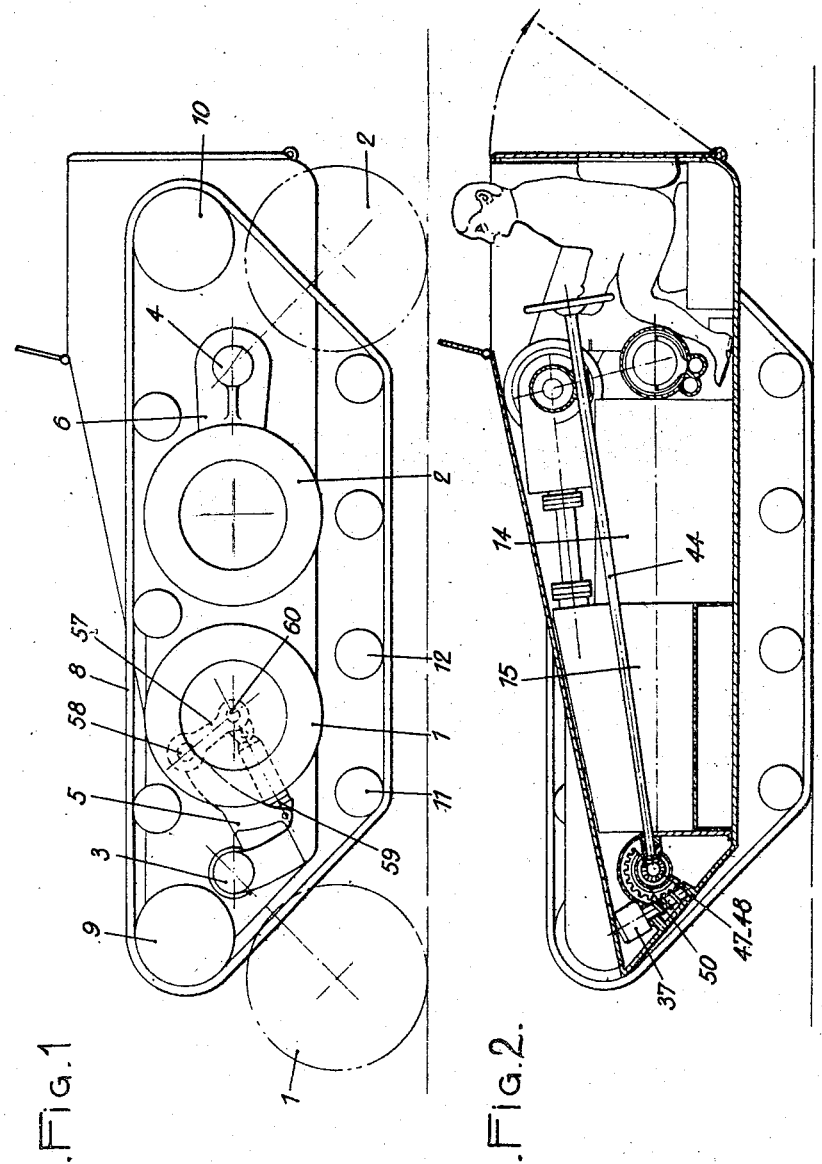
INVENTOR
JACQUES GARNIER
By Young, Emery & Thompson
Attys

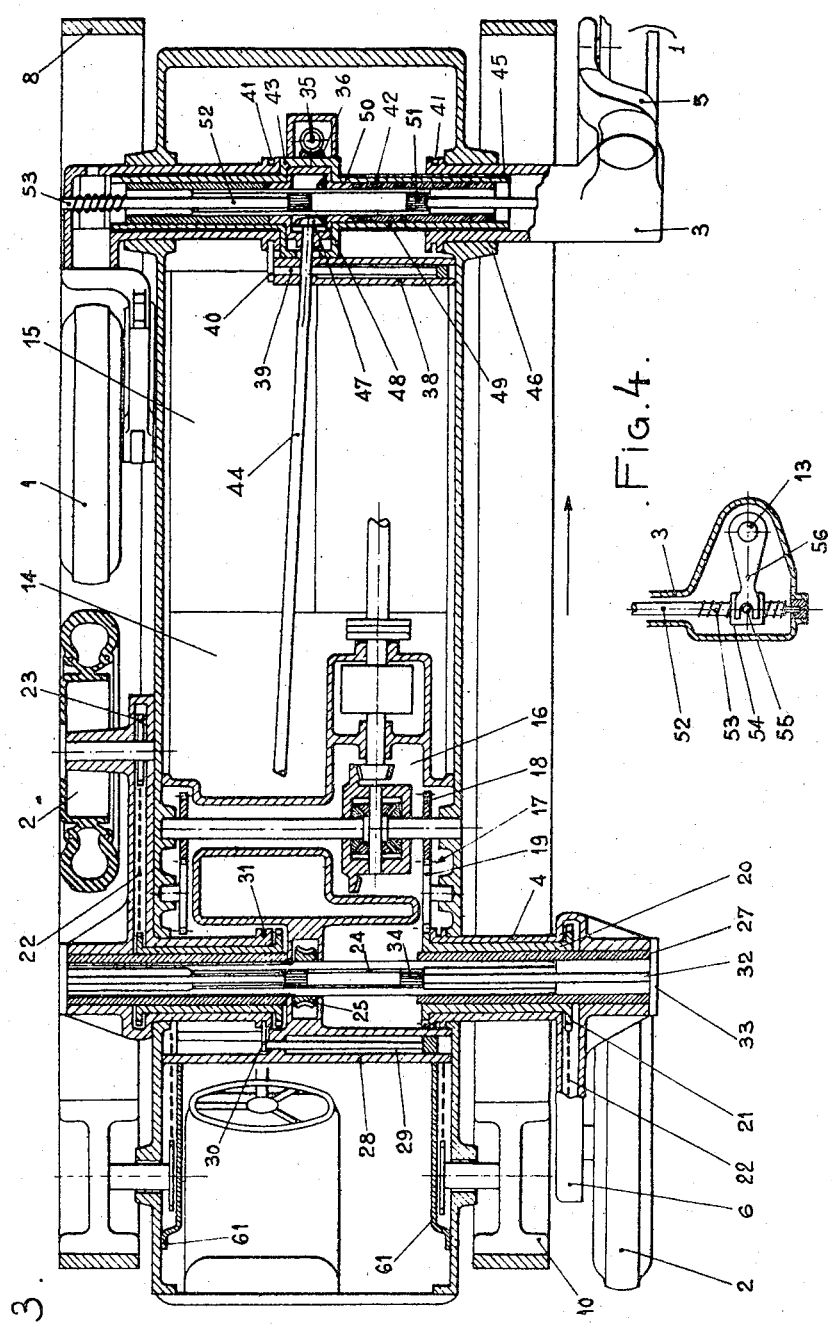

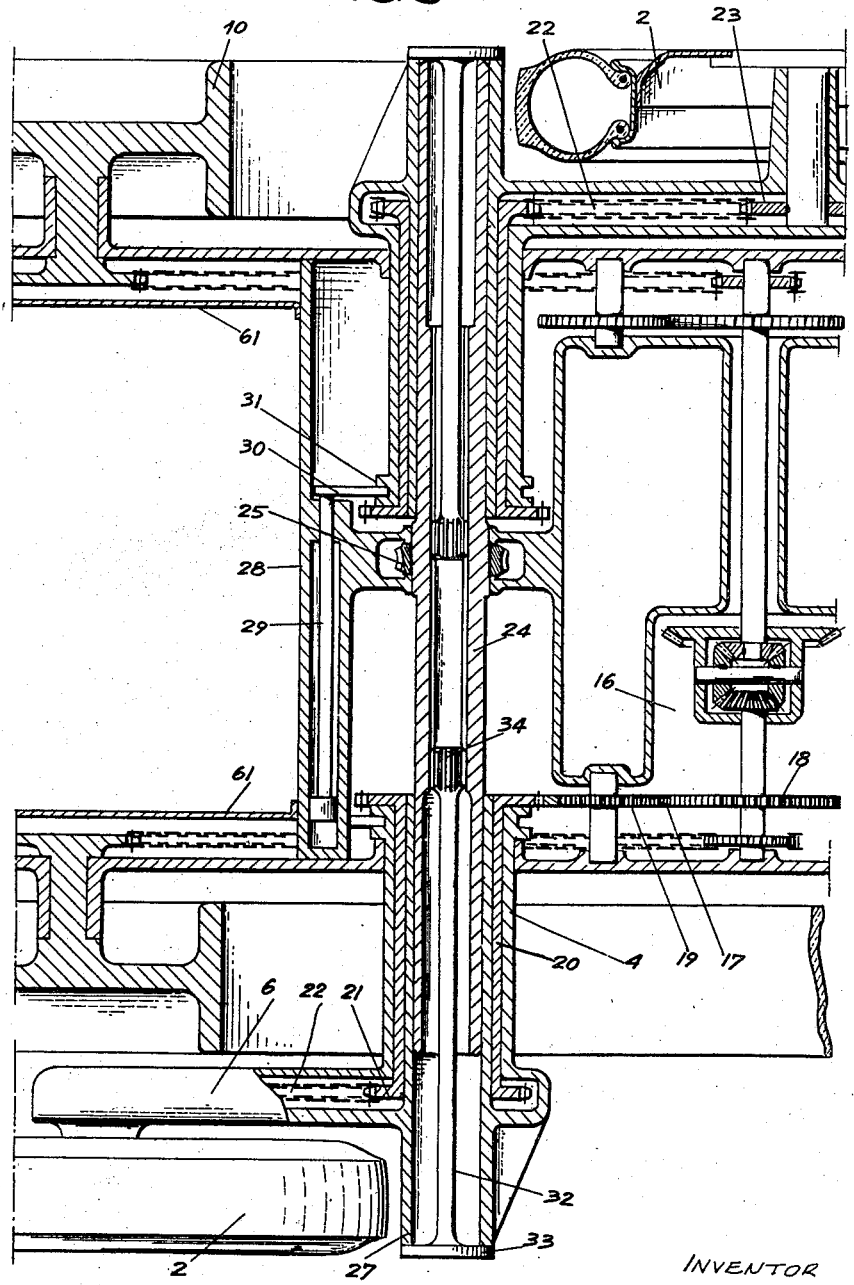

United States Patent Office 2,856,014
Patented Oct. 14, 1958

2,856,014
VEHICLE HAVING COMPOSITE PROPULSION MEANS

Jacques Garnier, Neuilly sur Seine, France, assignor to Physique & Mecanique S. A., Société Anonyme suisse, Lausanne, Switzerland Application July 27, 1955, Serial No. 524,666

Claims priority, application Switzerland August 2, 1954

10 Claims. (Cl. 180—9.1)

The present invention relates to a vehicle having composite propulsion means, using wheels and endless tracks, more especially intended for use on mountain roads, of great handiness over difficult ground, capable of travelling at high speeds on roads, very quiet-running and capable of turning on the spot.

It is hardly necessary nowadays to praise the advantages of endless tracks in running on difficult terrain, but they are really only used during about 5 or 10% of the life of the vehicle, and constitute a hindrance during the rest of the time, either on hard ground (poor suspension) or even more so when the vehicle is travelling at speeds in excess of 50–60 kilometres per hour (short life of tracks, and bad road-holding properties), whilst pneumatic tyres permit of all speeds in the best conditions.

The vehicle which is the subject of the invention is therefore a composite one, and combines both methods of propulsion. Many constructions have employed a principle of this kind; but up to the present time the vehicles produced have been heavy and very bulky as to width, or were of the half-track type. On the contrary, the present vehicle has full tracks, exhibiting the great advantage of being capable of turning the vehicle on the spot, in the same conditions as in the case of all devices propelled by tracks, but the present vehicle is of reduced bulk.

It is propelled along roads by means of the rear wheels, drive being imparted only to said rear wheels. The transmission is therefore relatively simple. Steering on roads is effected by changing the direction of the front wheels. However, as has been stated hereinbefore, this vehicle is capable of turning on the spot by using the tracks, which can be brought into action as soon as the wheels have been lifted. This operation can be carried out in a few seconds by means of hydraulic jacks, for example.

The inconsiderable width of the vehicle enables it to negotiate the narrowest places, in the smallest village street. In fact, in the final position into which the wheels are retracted, and in accordance with the essential features of the invention, the said wheels are lodged inside the tracks and are therefore within the body width of the vehicle, determined by these very tracks.

The latter are not used except in case of absolute necessity, and therefore the calculations of their dimensions may be based primarily on considerations of loads which would tend to break the tracks, omitting any considerations of dimensions usually necessary to permit long wear, this making it possible to provide very light and economical tracks; moreover, provided with studs, they maintain their maximum effectiveness on any kind of bad ground.

Past or present known constructions of half-track or wheeled vehicles do in fact enable the vehicle to negotiate most kinds of terrain, but in no case do they also enable the vehicle to turn on the spot, which is a serious disadvantage. The method which consists in providing two driving cabins can only be used with large machines, and at the cost of considerable mechanical complexity.

Suspension is provided by coil springs lodged in telescopic tubes, for the front wheels, and by leaf springs or the like for the rear wheels and for the track rollers.

The construction of a machine of this type is relatively simple despite its two methods of propulsion, and does not require complicated tools.

In the accompanying drawings:

Fig. 1 is a side elevation of a vehicle constituting one form of embodiment.

Fig. 2 is a corresponding longitudinal vertical cross-sectional view thereof.

Fig. 3 is a horizontal sectional view on a larger scale of the vehicle in question, showing on the right-hand side the wheels in the lowered position and showing the wheels retracted on the left-hand side.

Fig. 4 is a cross-sectional detail view.

Fig. 5 is a fragmentary horizontal sectional view somewhat similar to that of Fig. 3 but showing only the rear axle.

Figure 6:
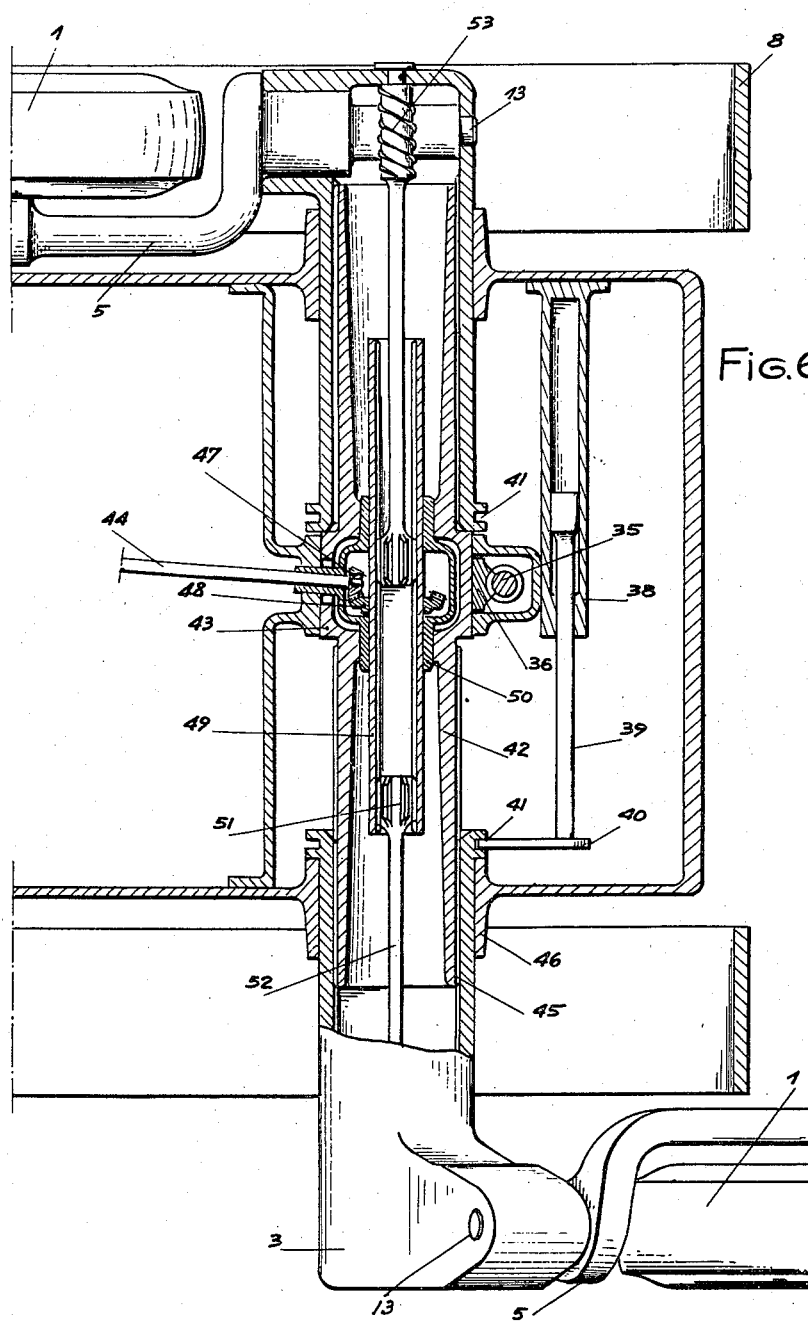
Fig. 6 is a view similar to Fig. 5 showing only the front axle.

According to the essential feature of the invention, each set of wheels 1, 2 is mounted in overhung fashion on the ends of an axle 3, 4 which pivots about its longitudinal axis so as to make it possible to bring the wheels from their position of use as indicated in chain-dotted lines in Fig. 1 into their retracted position, and vice versa; the retracted position is shown in full lines on the aforesaid Figure. This raising movement proper is followed by an operation wherein the wheels of each set are moved towards one another, coming to be situated finally inside the tracks 8 owing to a telescopic movement of the axles 3, 4.

The arms 5, 6 which carry the wheels are movable in vertical planes located outside the outer edges of the tracks 8, which are of conventional construction, and whose idler wheel 9 and sprocket wheel 10 and guide rollers 11, 12 etc., occupy fixed positions, since the change from one method of propulsion to another is effected solely by shifting the wheels 1, 2, the downward movement of which, after they have been brought out to their normal spacing or track width, first of all brings them into contact with the ground and then, according to the invention, lifts the vehicle, whose tracks are thus rendered inoperative.

To this end, the arms 5, 6 of these wheels move from a substantially horizontal orientation in the raised or retracted position (Fig. 1) by passing through the vertical or neutral position, to take up an inclination of approximately 45° in the operative position.

The arms 6 carried by the rear telescopic axle 4 are hollow and contain the means for driving the corresponding rear wheel 2. The front arms 5 are fast with a pivot 13 (see Fig. 4) carried by the rotary telescopic axle 3 so as to make it possible to change the direction of the front wheels.

The constant-mesh gear-box provided with clutch means corresponding to each gear train, has already been the object of known constructions.

The same applies to the suspension means for the front and rear wheels, and to the suspension means for the rollers which guide the tracks.

Thus numerous constructional modifications might be envisaged, according to the particular use of the vehicle in question, and the requirements which it must meet, without departing from the scope of the invention.

Fig. 3 shows diagrammatically in more detail, and merely by way of example, one form of embodiment of the mechanisms for hoisting and retracting the wheels, for transmitting the driving force to the rear wheels, and for changing the direction of the front wheels, in a vehicle according to the invention.

In this figure, the vehicle's engine is designated diagrammatically by 14, and its gear-box by 15.

The differential mechanism designated generally by 16, and used for driving the tracks, is of known construction, as has also been stated hereinbefore, and therefore does not have to be described further in detail.

17 designates a gearing which transmits the driving force from the differential to the rear axle 4. Through the intermediary of the pinions 18 and 19, the rotation of the shaft of the differential is transmitted to a hollow shaft 20 whose inner end carries a toothing meshing with the pinion 19, and whose other end carries a pinion 21 which entrains the rear wheel 2 by means of an appropriate transmission, which in the present case takes the form of the chain 22 and the pinion 23 keyed to the axle shaft of the wheel 2.

The rear wheels are lifted by the hollow shaft 24, on which is keyed a toothed wheel or toothed sector 25 engaged by a worm (not shown) and driven in rotation by an auxiliary motor, for example an electric motor.

It has been stated that the wheel-lifting operation proper is followed by a telescoping of their axle, effecting the retraction of these wheels within the tracks 8; this is effected in the following manner:

For each of the two halves of the rear axle 4 there is provided an hydraulic jack having a fixed cylinder 28 and a piston rod 29. At its free end the said rod carries a fork 30 engaged in the outer circular groove 31 of the corresponding half of the axle 4. Thus the longitudinal movement of the piston rod 29 is transmitted to axle 4 to cause it to extend or retract in telescopic fashion, without preventing its rotational movement which corresponds to the hoisting proper of the wheels.

The suspension of the rear wheels, in the example of embodiment shown, is effected at each of the two halves of the axle by a central torsion bar 32 rendered fast with the body of the axle 4 by means of the disc 33, and sliding with its other end in the inside of the hollow shaft 24, through the intermediary of splines 34 which render this end of the torsion bar fast in rotation with the said hollow shaft.

The lifting of the front wheels is effected by the same means (tangent screw 35 and sector 36), the corresponding servomotor, clearly visible in Fig. 2, being designated by 37.

The telescoping of the front axle is effected in the same manner by the jacks 38—39 and the two forks 40 engaged in the corresponding circular grooves 41 of the two half-axles 3.

Fig. 3 shows that the sector 36 is keyed to a false axle 42 which, in its middle portion, forms a casing 43 comprising an aperture intended for the free passage of the steering column 44, the peripheral development of this aperture corresponding to the angular path of travel through which the wheels are lifted. The half-axle 3 is fast with the false axle 42 by means of splining 45 which does not prevent the telescopic movement of the half-axles, which are suitably guided for this purpose in plain bearings 46.

The vehicle is steered by changing the direction of the front wheels in the following manner: the rotation of the column 44 is transmitted by means of the bevel gearing 47—48 mounted in the steering box 50, to a hollow shaft 49 which is fast in rotation by means of splines 51 with the inner end of two central half-shafts 52 each of whose other ends forms a threaded member 53 engaged in a nut 54 (see Fig. 4) which carries two diametrically opposite vertical pivots 55. A steering lever 56 keyed on the aforesaid pivot 13 is engaged on the pivots 55. Thus the rotation of each half-shaft 52 is converted by the nut 54 into an angular displacement of the pivot 13 corresponding to the desired angle of turn. Of course the steering levers 56 belonging to each of the two wheels are keyed angularly to the pivots 13 in accordance with the steering diagram.

The suspension of the front wheels, which can be seen from Fig. 1, is provided for, in the example chosen, by a lever 57 carried in overhung fashion on a pivot 58 carried by the arm 5. At its free end the lever 57 bears on a telescopic shock absorber 59 suitably articulated at its ends on the one hand on the lever 57 and on the other hand on the arm 5. The stub axle 60 of the wheel is fixed to the free end of the lever 57.

For propulsion by means of the caterpillars, it need only be stated that the rear sprockets 10 are driven from the differential 16, through any transmission mounted in the casings 61.

The constructional details of the various mechanisms can vary of course from those which have been described and illustrated herein merely by way of example.

I claim:

1. A vehicle comprising a frame, means comprising endless tracks supporting said frame, ground engaging wheels on said vehicle, each of said wheels being mounted on an arm extending from an axle, and means mounting each of said axles for axial movement laterally of said frame and for rotational movement about its own axis, each of said wheels having a diameter less than the distance between the upper and lower runs of said tracks, whereby said wheels may be moved from a ground engaging position to a retracted position between said tracks by rotating said axles and moving them axially.

2. The vehicle of claim 1, and means to steer one set of said wheels.

3. The vehicle of claim 1, and means to steer one set of said wheels comprising a pivotal connection between the arm of each set and its corresponding axle, and means to cause said arms to pivot about said pivotal connections.

4. The vehicle of claim 3, the axles of the steerable wheels being hollow, said latter mentioned means comprising a shaft extending axially of said axles, the ends of said shaft being threaded, a nut on each of said threaded ends, a forked lever engaged with its forked end with each of said nuts, each of said levers having its other end fast with the corresponding arm, and means to cause said shaft to rotate, whereby upon shaft rotation said nuts will travel axially of said shaft and cause rotation of said levers and arms.

5. The vehicle of claim 1, and means to cause each of said axles to move axially comprising means engaging each of said axles at the inner end thereof, and means to cause said engaging means to move laterally of said vehicle.

6. The vehicle of claim 1, and means to cause each of said axles to move axially comprising a groove circumscribing the inner end of each axle, a fork engaged in said groove, a piston rod carrying said fork, said piston rod being carried by a piston in a cylinder, and means to admit fluid under pressure into said cylinder, said piston rod and cylinder lying transversely of said vehicle.

7. The vehicle of claim 1, said axles being hollow, and means to cause each of said axles to rotate about its axis comprising a shaft, a sector gear fixed to said shaft, said shaft having a splined connection with a pair of said axles, and a worm engaged with said sector gear, whereby upon rotation of said worm, said sector gear, shaft and axles will be rotated.

8. The vehicle of claim 7, said vehicle having a main propulsion engine and a power take-off from said engine, said worm being operatively connected to said power take-off.

9. The vehicle of claim 7, said vehicle having a servo motor, said worm being operatively connected to said servo motor.

10. The apparatus of claim 1, and means to drive one set of said wheels.

References Cited in the file of this patent

UNITED STATES PATENTS

| 1,509,030 | Roy | Sept. 16, 1924 |
| 2,173,794 | Von Radiis et al. | Sept. 19, 1939 |

FOREIGN PATENTS

| 598,588 | France | Oct. 2, 1925 |
| 583,823 | Germany | Sept. 9, 1933 |
| 253,880 | Great Britain | May 25, 1926 |